United States Patent
Matthews et al.

[11] Patent Number: 5,487,412
[45] Date of Patent: Jan. 30, 1996

[54] GLASS FIBER AIRDUCT WITH COATED INTERIOR SURFACE CONTAINING A BIOCIDE

[75] Inventors: Kent R. Matthews, Littleton; Eric G. Schakel, Sedalia; Ricardo R. Gamboa, Littleton, all of Colo.

[73] Assignee: Schuller International, Inc., Denver, Colo.

[21] Appl. No.: 337,586

[22] Filed: Nov. 9, 1994

Related U.S. Application Data

[63] Continuation-in-part of Ser. No. 67,769, May 26, 1993, Pat. No. 5,379,806.

[51] Int. Cl.$^6$ ............................................. F16L 9/14
[52] U.S. Cl. ........................ 138/149; 138/103; 138/110; 138/137; 138/141; 138/177; 138/178
[58] Field of Search .................................... 138/145, 140, 138/137, 149, 177, 178, DIG. 2, DIG. 4, DIG. 6, DIG. 7, 97, 146, 103; 427/236; 428/921

[56] References Cited

U.S. PATENT DOCUMENTS

| | | | |
|---|---|---|---|
| 2,906,317 | 9/1959 | Keyes | 138/149 |
| 3,092,529 | 6/1963 | Pearson | 138/149 |
| 3,216,459 | 11/1965 | Schroeder et al. | 138/149 |
| 3,557,840 | 1/1971 | Maybee | 138/149 |
| 3,628,572 | 12/1971 | Shannon | 138/149 |
| 3,654,966 | 4/1972 | Waksman | 138/149 |
| 3,818,948 | 6/1974 | Hedges | 138/149 |
| 3,926,894 | 12/1975 | Clark | 138/DIG. 1 |
| 4,039,499 | 8/1977 | Steigelmann et al. | 138/149 |
| 4,310,585 | 1/1982 | Shannon | 138/149 |
| 4,312,605 | 1/1982 | Clarke | 138/97 |
| 4,395,159 | 7/1983 | Karuks et al. | 138/110 |
| 4,557,297 | 12/1985 | Montana | 138/149 |
| 4,775,585 | 10/1988 | Hagiwara et al. | 428/323 |
| 4,780,333 | 10/1988 | Smith et al. | 427/236 |
| 4,839,222 | 6/1989 | Jain | 429/921 |
| 4,968,556 | 11/1990 | Jain | 138/146 |
| 4,990,370 | 2/1991 | Terry et al. | |
| 5,379,806 | 1/1995 | Matthews et al. | 138/137 |

OTHER PUBLICATIONS

Owens Illinois Glass Company Brochure Insulation For Industrial (Jan./1939).

Primary Examiner—James E. Bryant, III
Attorney, Agent, or Firm—Cornelius P. Quinn

[57] ABSTRACT

A rigid, glass fiber airduct for conveying an airstream has an interior surface, adapted to be in contact with the airstream, which is coated with a polymeric coating comprising an organic or inorganic biocide. The polymeric coating has a dry solids content between 10 and 20 grams per square foot of duct board surface and retains its abrasion strength and puncture resistance whereby the interior surface of the airduct can be cleaned by conventional industrial or commercial cleaning procedures while in service without exposing glass fibers to the airstream.

4 Claims, 2 Drawing Sheets

GLASS FIBER AIRDUCT WITH COATED INTERIOR SURFACE CONTAINING A BIOCIDE

This patent application is a continuation-in-part of patent application Ser. No. 08/067,769; filed May 26, 1993; and entitled "FIBER GLASS AIRDUCT WITH COATED INTERIOR SURFACE CONTAINING AN ORGANIC BIOCIDE" and now U.S. Pat. No. 5,379,806; issued Jan. 10, 1995.

BACKGROUND OF THE INVENTION

The present invention relates to cleanable, glass fiber ducts for conveying air which are used in heating, ventilating and air conditioning systems.

It is common practice to use glass fiber duct liners in heating, ventilating and air conditioning systems. As discussed in Terry et al, U.S. Pat. No. 4,990,370, column 1, lines 33–50, the interior surfaces of these glass fiber duct liners, which are relatively low in density when compared to glass fiber ducts, are either coated with a rubberized or plastic material or a facing is applied to the surface to prevent portions of the duct liner from breaking away or flaking off due to erosion by the airstream within the duct liner. Without the coating, loose particles of dust and dirt, in the airstream being conveyed, strike the interior surface of the duct liner causing erosion so that portions of the duct liner break away or flake off. However, the coating is only sufficient to prevent the erosion of the interior surface of the duct liner and does not form the smooth, durable surface required to withstand the cleaning of the interior surface of the duct liner by maintenance personnel using conventional commercial or industrial cleaning methods.

Glass fiber airducts are also used in heating, ventilating and air conditioning systems. These airducts are formed from high density glass fiber duct boards having densities of at least 3.5 pounds per cubic foot as compared to densities of about 1.5 pounds per cubic foot for low density duct liners. The duct boards are formed by compressing blankets of resin coated glass fibers to an appropriate thickness and density and curing the resin binder. Due to the high densities and the heavy resin binder contents of the interior surfaces of the duct boards forming the airducts, the high density glass fiber airducts formed from the duct boards do not require coatings or facings on their interior surfaces to prevent the erosion of the interior surfaces of the airducts by airstreams carried by the airducts. However, like the duct liners discussed above, the prior art airducts have not had interior surfaces suitable for cleaning by conventional industrial or commercial cleaning methods.

With recent developments in air quality measurement devices and an overall increase in environmental awareness, there has been an increased interest in the air quality in all types of buildings employing heating, ventilating and air conditioning systems. While in service, especially when the air filtration system is not properly maintained, the interior air conveying surfaces of airducts pick up dust and become increasingly dirty. The accumulation of dust on the interior surfaces of airducts has been identified as a possible nutrient source for microbiological growth. The growth of microbes in a heating, ventilating and air conditioning system may compromise the indoor air quality of the building or home served by the system. Accordingly, there has been a need to provide a cleanable interior surface for airducts.

The interior surfaces of sheet metal airducts are often cleaned with rotating brushes having plastic bristles six inches to a foot in length. Another method of cleaning airducts uses industrial type vacuum cleaners. In addition, it is common to clean the interior surfaces of sheet metal airducts with liquid chemical disinfectants to remove microbiological growth from the interior surfaces of the airducts.

Glass fiber airducts not only effectively convey the air in heating, ventilating and air conditioning systems, unlike sheet metal airducts, glass fiber airducts also provide an acoustical benefit by reducing the transmission of sound. While glass fibers do not support mold growth and the use of liquid chemical disinfectants on the interior surfaces of glass fiber airducts is not necessary, the cleaning of uncoated glass fiber airducts to remove dust and dirt by the methods discussed above can result in damage to the interior surfaces of uncoated glass fiber airducts by puncturing and/or wearing away the interior surfaces of the airducts. Accordingly, there has been a need to provide glass fiber airducts with cleanable interior surfaces that can be cleaned during service by normal commercial or industrial cleaning procedures.

SUMMARY OF THE INVENTION

The high density glass fiber airduct of the present invention has a polymeric coating on its interior surface to permit the interior surface of the airduct to be cleaned during service by conventional commercial or industrial cleaning procedures. To form the smooth, cleanable, durable surface required, the polymeric coating used in the present invention has a dry solids content of between 10 and 20 grams per square foot of duct board surface. This assures that the polymeric coating has the necessary thickness to retain its abrasion strength and puncture resistance, even when subjected to temperatures of 250° Fahrenheit for long periods of time.

The polymeric coating, used in the present invention, is provided with an organic or inorganic biocide that prevents microbiological growth on the coating surface which forms the interior surface of the airduct. With the organic or inorganic biocide, the coating surface does not require cleaning with liquid chemical disinfectants thereby eliminating the need for this cleaning procedure with a resulting savings in cleaning and maintenance costs. The interior surface of the airduct can be cleaned by using only the rotating brushes and/or industrial vacuum cleaners normally used to clean airducts.

It was also learned that, for better than 90% of the airducts fabricated with the high density, polymeric coated duct boards of the present invention, the acoustical sound absorbing properties of the airducts improved.

Thus, the airduct of the present invention, with its polymeric coating, provides a cost effective solution to the need for glass fiber airducts which can be cleaned, without damage, by the conventional cleaning procedures employed in the industry. In addition, the coated glass fiber airduct of the present invention, with its biocide containing polymeric coating, eliminates the need for cleaning the interior of the airduct with liquid chemical disinfectants and in most instances improves the acoustical performance of the airduct.

DESCRIPTION OF THE PREFERRED EMBODIMENTS

Figure 1:
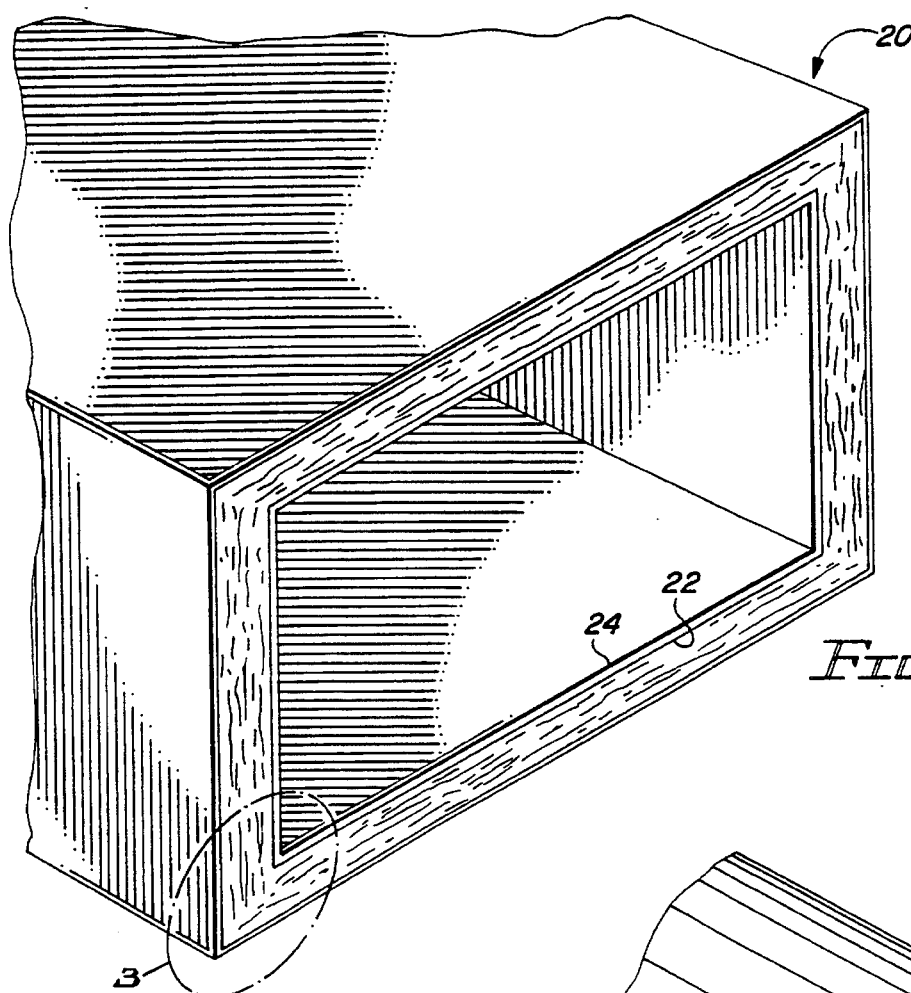
FIG. 1 is a perspective view of a cleanable airduct of the present invention with a rectangular cross section.
Figure 2:
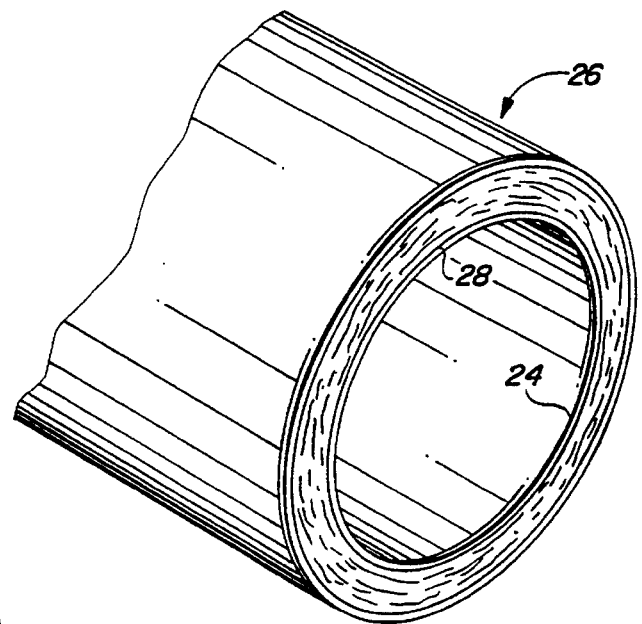
FIG. 2 is a perspective view of a cleanable airduct of the present invention with a round cross section.
Figure 3:
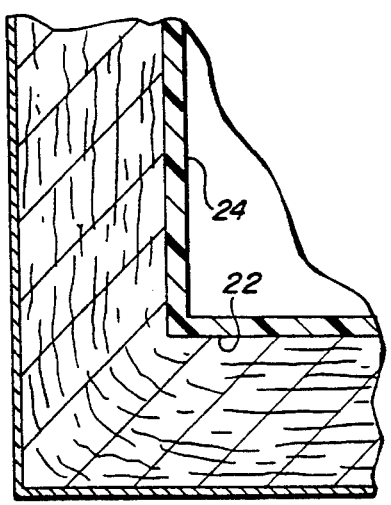
FIG. 3 is an enlarged detail of the portion of FIG. 1, encircled and labeled 3, illustrating in greater detail the polymeric coating layer on the interior surface of the glass fiber airduct.
Figure 4:
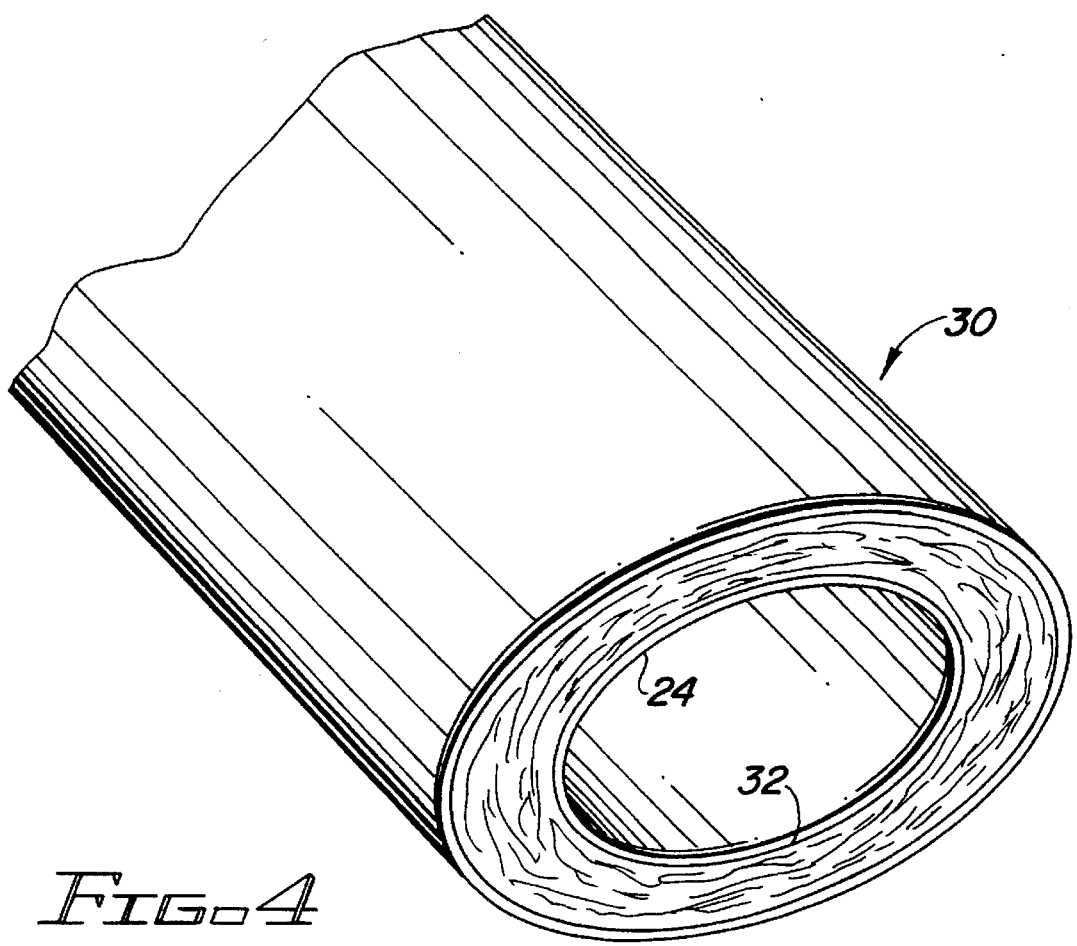
FIG. 4 is a perspective view of a cleanable airduct of the present invention with an oval or flat oval cross section.

FIG. 1 shows a rigid, airduct 20 of the present invention having a rectangular cross section; FIG. 2 shows a rigid, tubular airduct 26 having a circular cross section and FIG. 4 shows a rigid, tubular airduct 30 having an oval or a flat oval cross section. The airducts 20, 26 and 30 are made of high density glass fiber duct boards which typically have densities between 3.5 and 5.5 pounds per cubic foot. The interior surfaces 22, 28 and 32 of the airducts are provided with a polymeric coating 24 to permit the interior surfaces of the airducts to be cleaned while in service without exposing glass fibers to the airstreams being conveyed within the airducts.

One polymeric coating material, that can be used as the polymeric coating in the present invention, is an acrylic foam coating, such as, EVODE TANNER XA 9900 Series coating. The polymeric coating 24 is applied in accordance with the disclosure of Terry et al, U.S. Pat. No. 4,990,370, which is incorporated herein by reference. To assure that the polymeric coating 24 has the required thickness to provide a smooth, durable surface capable of withstanding normal industrial or commercial cleaning procedures, the polymeric coating 24 applied to the interior surfaces 22, 28 and 32 of the airducts 22, 26 and 30 has a dry solids content between 10 and 20 grams per square foot of duct board surface and, preferably, between 12 and 16 grams per square foot of duct board surface. Other polymeric coating materials can be used for the polymeric coating 24 provided such polymeric materials have the abrasion strength and puncture resistance, as tested below, of the EVODE TANNER XA 9900 Series coating material and retain those physical properties while in service.

The polymeric coating 24 used in the present invention retains its abrasion strength and puncture resistance after being subjected to a temperature of 250° Fahrenheit for 60 days. After being subjected to this heat test, a glass fiber duct board, having a coating between 10 and 20 grams dry weight per square foot of duct board surface, exhibits no significant loss in its abrasion characteristics or puncture resistance.

The abrasion resistance of the coated duct board is tested by firmly dragging the edge of a coin over the surface of the polymeric coating 24 after the heat test has been completed to determine if the heat test has caused the polymeric coating to become brittle whereby the polymeric coating will flake off when subjected to a scraping action. There should be no flaking off of the polymeric coating during this test. The puncture resistance of the polymeric coating 24 is measured by applying a force on and perpendicular to the coating surface after the heat test has been completed. The perpendicular force is applied with a steel ball, one inch in diameter, that is pressed against the surface of the polymeric coating under a specific pressure. The polymeric coatings 24 of the present invention are normally able to withstand a pressure of 20 pounds without puncturing. If there is a failure or puncture at a pressure of 15 pounds or less, the polymeric coating is unacceptable for the coated duct boards used in the present invention.

The polymeric coatings 24 of the present invention are also provided with a commercially available organic or inorganic biocide system to prevent the growth of microbes on the interior surface of the coated glass fiber airducts 20, 26 and 30. An example of an inorganic biocide that can be used in the polymeric coating 24 is silver nitrate. As mentioned above, the use of the organic or inorganic biocide eliminates the need for cleaning the interior surfaces of the airducts 20 and 26 with the liquid chemical disinfectants that are employed to clean the interior surfaces of sheet metal airducts to remove microbe growth from the surfaces of the sheet metal airducts.

The commercially available organic or inorganic biocide systems used in the polymeric coating 24 of the present invention must meet the following tests: ASTM 1071 Part 7.3 (fungi resistance); ASTM G21 (fungi resistance); ASTM G22 (bacterial resistance); and Underwriters Laboratory UL 181 Part 12 (mold growth and humidity test).

The sound absorption coefficients (ASTM C-423; Type A Mounting) of uncoated MICRO-AIRE duct boards were compared with the sound absorption coefficients of the coated MICRO-AIRE duct boards of the present invention. The results are as follows:

| BOARD TYPE | NRC UNCOATED | NRC COATED |
| --- | --- | --- |
| 475 | 0.65 | 0.80 |
| 800 1" | 0.75 | 0.75 |
| 800 1.5" | 0.90 | 0.95 |

In two of the three tests, the polymeric coating measurably improved the acoustical sound absorbing properties of the duct boards. The products with the improved sound absorption properties comprise better than 90% of the products produced and sold for this product line. Thus, the sound absorbing properties of essentially the entire product line were enhanced through the use of the polymeric coating 24 of the present invention.

While the glass fiber airduct 20 shown in FIG. 1 has a rectangular cross section and the glass fiber airduct 26, shown in FIGS. 2, has a tubular cross section which is round, the cross sections of the tubular airducts of the present invention can be oval, flat oval as shown in FIG. 4 or other cross sectional configurations.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A glass fiber airduct for conveying an airstream comprising: a rigid, glass fiber duct formed of duct board having a density of at least 3.5 pounds per cubic foot; said glass fiber duct having an interior surface adapted to be in contact with an airstream; said interior surface of said glass fiber duct having a polymeric coating layer comprising a polymeric coating of a surface of said duct board; said polymeric coating having a dry solids content between 10 and 20 grams per square foot of said duct board surface; said polymeric coating layer having an inorganic biocide to prevent microbiological growth on said interior surface of said glass fiber duct; and said polymeric coating layer retaining its abrasion strength and puncture resistance after being subjected to a temperature of 250° Fahrenheit for 60 days whereby said interior surface of said glass fiber duct can be cleaned without exposing glass fibers to the airstream.

2. The glass fiber airduct of claim 1, wherein: said duct has a rectangular cross section.

3. The glass fiber airduct of claim 1, wherein: said duct has a circular, oval or flat oval cross section.

4. The glass fiber airduct of claim 1, wherein: said polymeric coating has a dry solids content between 12 and 16 grams per square foot.

\* \* \* \* \*